Nov. 8, 1966  H. B. COHEN  3,283,473
PACKAGING DEVICE
Filed May 9, 1963  6 Sheets-Sheet 4

INVENTOR.
HENRY B. COHEN
BY
ATTORNEY

Nov. 8, 1966 H. B. COHEN 3,283,473
PACKAGING DEVICE

Filed May 9, 1963 6 Sheets-Sheet 5

INVENTOR.
HENRY B. COHEN
BY
ATTORNEY

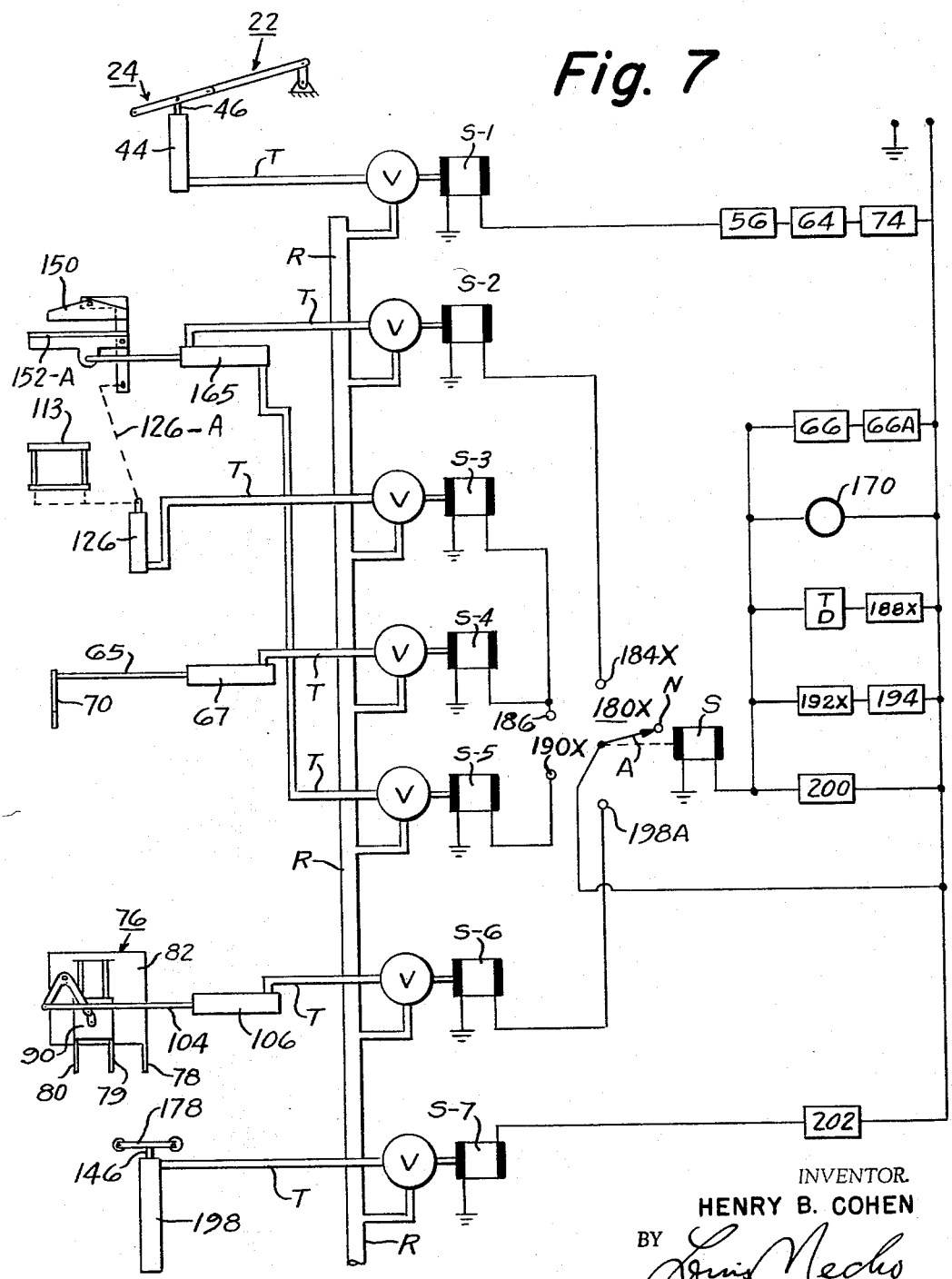

United States Patent Office 3,283,473
Patented Nov. 8, 1966

3,283,473
PACKAGING DEVICE
Henry B. Cohen, % Standard Wire Co.,
2430 N. Hancock St., Philadelphia, Pa.
Filed May 9, 1963, Ser. No. 279,345
17 Claims. (Cl. 53—76)

This invention relates to a machine for automatically wrapping and heat-sealing objects or containers, such as a piece of meat, or a tray, or receptacle holding a piece of meat, or any other object.

One object of the invention is to produce an improved packaging machine of the type set forth.

Meats, and similar items, have heretofore been exposed for sale in a manner which permitted them to be handled by the customers and the purchase of each customer was individually weighed, priced, and wrapped. In order to protect the meat or other object from contact with the hands of the public and to reduce selling expenses and to cut down waiting time for the customer, it has become increasingly the practice to pre-weigh, pre-price and pre-wrap the merchandise in sealed, transparent packages which are exposed on the shelves of self-service stores. As far as I am aware, the practice hereto has been manually to wrap each item and to subject the overlapping edges of the wrapping material to heat to cause the edges to fuse together. The heat sealing process has been carried out by passing the edges to be fused over a hot plate, or by feeding the edges to be used to a heat-sealing machine, such as that shown, for example, in Marziani patents, Nos. 2,414,157; 2,490,915 and 2,608,333 and the patents referred to in said Marziani patents.

The wrapping processes referred to required considerable amount of skill and manual labor and the speed and accuracy of their operation were affected by the limitation of the operator.

It is therefore a further object of the invention to produce an improved machine which will rapidly, automatically and neatly wrap and heat-seal objects, or packages, in a continuous manner and without the need of an operator.

A still further object is to produce an improved machine which is automatically set in motion by the presence of a package or object to be wrapped and which stops automatically in the absence of objects, or packages, to be wrapped and sealed.

A still further object is to provide a machine of the type set forth which is capable of wrapping and sealing packages or objects of different sizes and shapes without manual adjustment.

In the accompanying drawings:

FIG. 2A is an enlarged sectional view looking in the direction of line 2A—2A on FIG. 2.

FIG. 7 is a diagrammatic view showing the sequence of operations.

Figure 1:
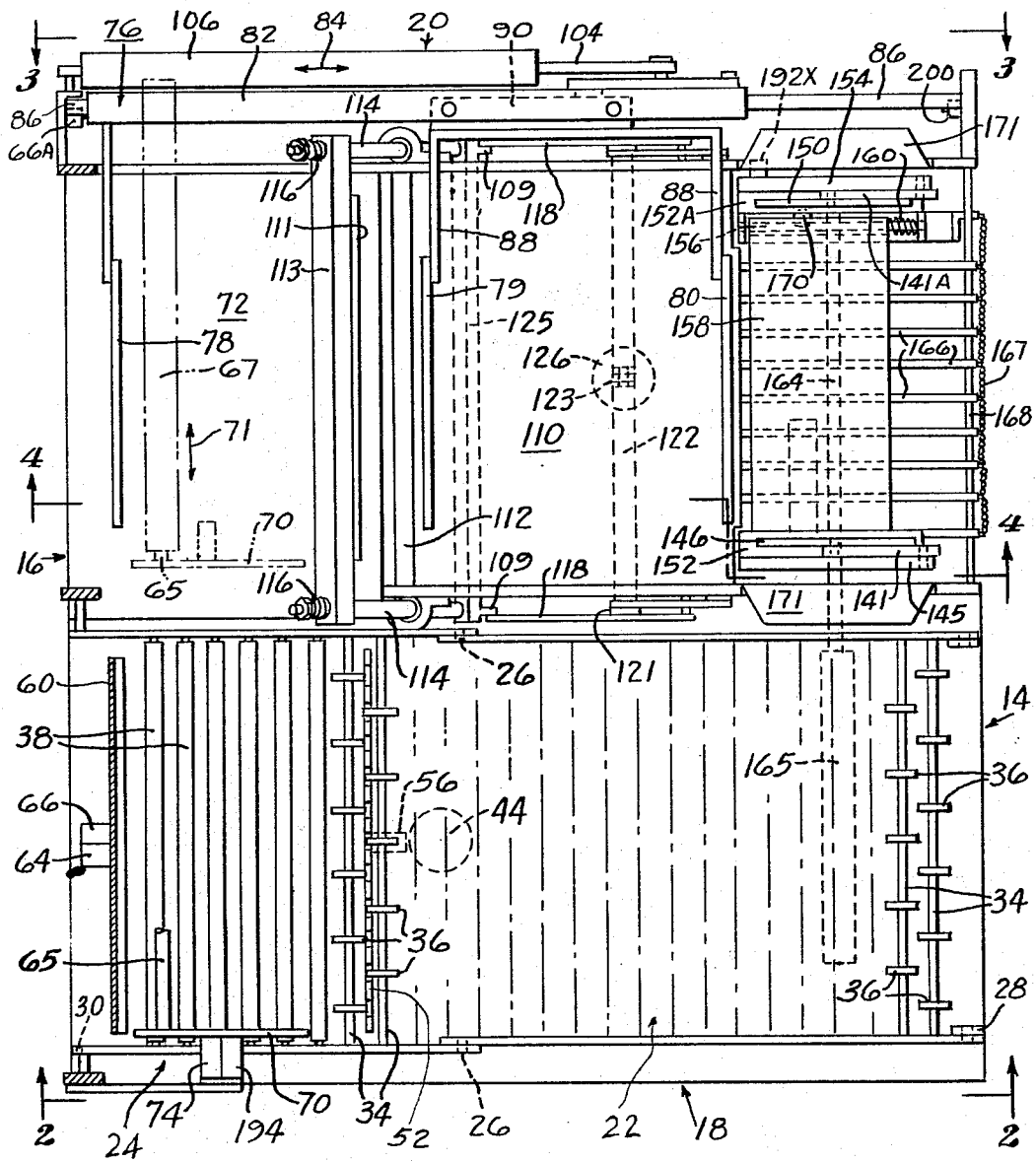
FIG. 1 is a top plan view of a wrapping machine embodying the invention.

Referring now to the drawings wherein similar reference characters designate similar parts, there is shown a wrapping machine which is mounted on a frame 12 and has a front 14, a rear 16 and sides 18 and 20. The units, or objects to be wrapped, are fed to the front of the machine near side 18 thereof and the wrapped units are delivered at the front end of the machine near side 20 thereof.

Figure 2:
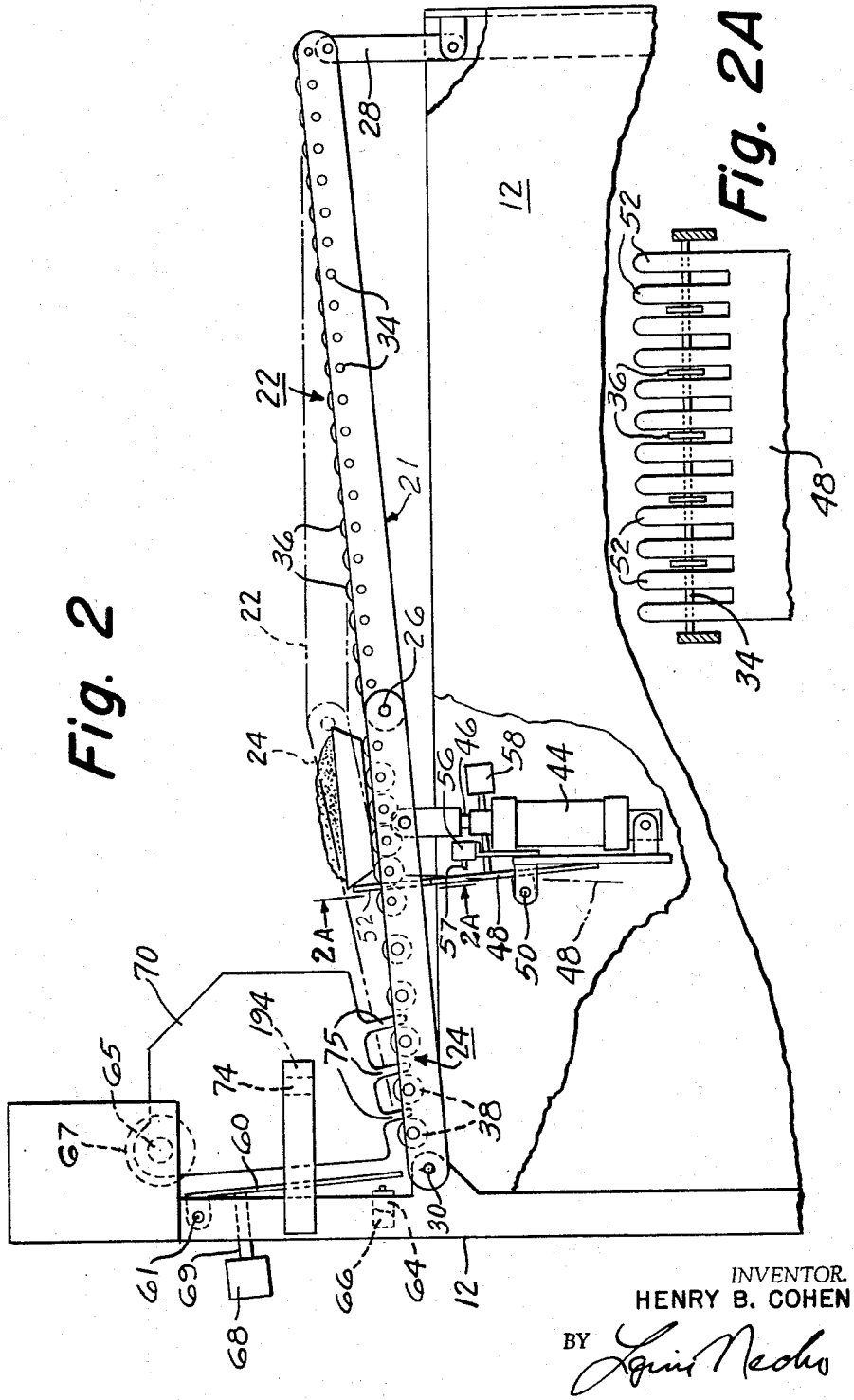
FIG. 2 is a side view looking in the direction of line 2—2 on FIG. 1.

Extending from the front 14 to the rear 16 and along the side 18 of the machine is a conveyor 21 which inclines downwardly from the front to the rear of the machine, as shown in solid lines in FIG. 2. This conveyor is formed of front and rear sections 22 and 24 which are pivotally connected to each other at 26. Additionally, the front end of front section 22 is connected to the frame by link 28 and the rear end of rear section 24 is pivoted to the machine framework, as at 30.

Front conveyor section 22 and the adjacent, or front, marginal portion of conveyor section 24 are formed of parallel spaced, freely rotatable rods 34 which are provided with antifriction rollers 36. The remainder of rear conveyor section 24 is formed of rotatable rods 38 which, except for not having any rollers, are similar to rods 34. The diameter of rods 38 is about equal to the diameters of rolls 36 so that conveyors 22 and 24 form a continuous surface.

From FIG. 2 it will be seen that, in the solid line position thereof, conveyor sections 22 and 24 form a continuous running surface so that an object placed on front conveyor section 22 will roll down until it reaches rods 38 of conveyor section 24. It will also be seen that if the pivotally connected adjacent ends of conveyor sections 22 and 24 are raised to the position shown in broken lines in FIG. 2, the reverse inclination of conveyor section 22 prevents any object on this conveyor section from moving onto conveyor section 24 and the accentuated inclination of conveyor section 24 accelerates the downward and rearward movement of an object which has already reached the front end of conveyor 24. The reason for this arrangement will become apparent later on.

The adjacent ends of conveyor sections 22 and 24 are raised, or humped, by means of any suitable device, such as a pneumatic or hydraulic cylinder 44, and may be lowered by reverse action of the cylinder, or by gravity. The manner in which cylinder 44 is actuated and its relation to the cycle of operation will be hereinafter described. It is now only necessary to point out that when in its lower position, piston rod 46 of cylinder 44 supports the front end of rear conveyor section 24 and that, when piston rod 46 is moved upwardly, it humps the adjacent ends of conveyor sections 22 and 24, as shown in broken lines in FIG. 2.

Adjacent cylinder 44 is a gate 48 which is pivoted to the frame of the machine, as at 50, so as to be movable between the solid and broken line positions of FIG. 2. The upper end of the gate 48 is slotted to form fingers 52 which project upwardly between rollers 36 at the front end of conveyor section 24, FIGS. 1 and 2. The depth of the slots between fingers 52 is such that, when conveyor section 24 is in its lower, solid line position, fingers 52 will project into the path of movement of an object or unit 54 to deter movement of said unit toward rear conveyor section 24. Conversely, when conveyor sections 22 and 24 are humped by the upward movement of piston rod 46 of cylinder 44, the upper ends of fingers 52 will be well below the upper surface and conveyor 24 and unit 54 will be able to move to the rear end of the conveyor.

Mounted on the frame of the machine, adjacent gate 48, is a switch 56, the contact arm 57 of which is normally biased outwardly, or to switch-closing position. Switch arm 57 is so related to gate 48 that, when the gate is in the solid line position in FIG. 2, it is out of engagement with contact arm 57 and switch 56 will be closed and so that, when gate 48 is moved to the broken line position of FIG. 2, contact arm 57 will be pushed inwardly (to the right in FIG. 2) and switch 56 will be open. Gate 48 is moved to its broken line, switch-56-opening position by means of an adjustable counterweight 58, or the like, which exerts enough force to move the gate far enough in clockwise direction, in FIG. 2, to push contact arm 57 inwardly to open switch 56. Counterweight 58 (or other element) is so calibrated that the weight of a unit 54 coming to rest against fingers 52 will move the gate from the broken to the solid line position, thus permitting contact arm 57 to move outwardly to close switch 56. In other words, the presence of a unit 54 resting against gate 48 closes switch 56, and vice versa. The reason for closing and opening switch 56 and its sequence in the cycle of operation are explained below.

At the end of its travel over conveyor section 24, the unit to be wrapped strikes abutment plate 60 and comes to rest on roller-less rods 38. Abutment plate 60 is pivoted, as at 61, at its upper end to the frame of the machine so as to be swingable about said pivot. Located back of the lower portion of plate 60 (to the left in FIG. 2) is a normally closed switch 64 and a normally open switch 66. Abutment plate 60 is normally kept out of engagement with switches 64 and 66 by a counterweight 68 which is adjustable on rod 69 so that the inertia of abutment plate 60 and counterweight 68 will be such that the pressure exerted by a unit 54 against plate 60 will be enough to rotate plate 60 in clockwise direction, FIG. 2, far enough to open switch 64 and to close switch 66, for the purpose hereinafter set forth.

The machine further includes a shifter plate 70 which is reciprocated, by the piston rod 65 of a cylinder 67, from its solid, to its broken line position, and back, or in the direction of arrow 71, in FIG. 1. The sequence of movement of shifter plate 70 will be hereinafter set forth and it now only need be noted that the reciprocation of shifter plate 70 serves to move a unit 54, which happens to be resting against abutment plate 60, from conveyor section 24 to platform 72 and that return movement of shifter plate 70 to its solid line position closes normally open switch 74, which is located in the path of movement of the shifter plate. The function of switch 74 is hereinafter explained. It is enough now to point out that switches 56, 64 and 74 are connected in series (FIG. 7) and that they must all be closed to activate cylinder 44 in conveyor-humping direction.

Shifter plate 70 is provided with pendent fingers 75 which pass between roller-less rods 38 of the rear portion of rear conveyor section 24 and through registering slots, not shown, in platform 72 to prevent any thin object from passing, or from becoming wedged between, the bottom edge of shifter plate 70 and rods 38 and between the edge of said plate and platform 72.

Figure 3:
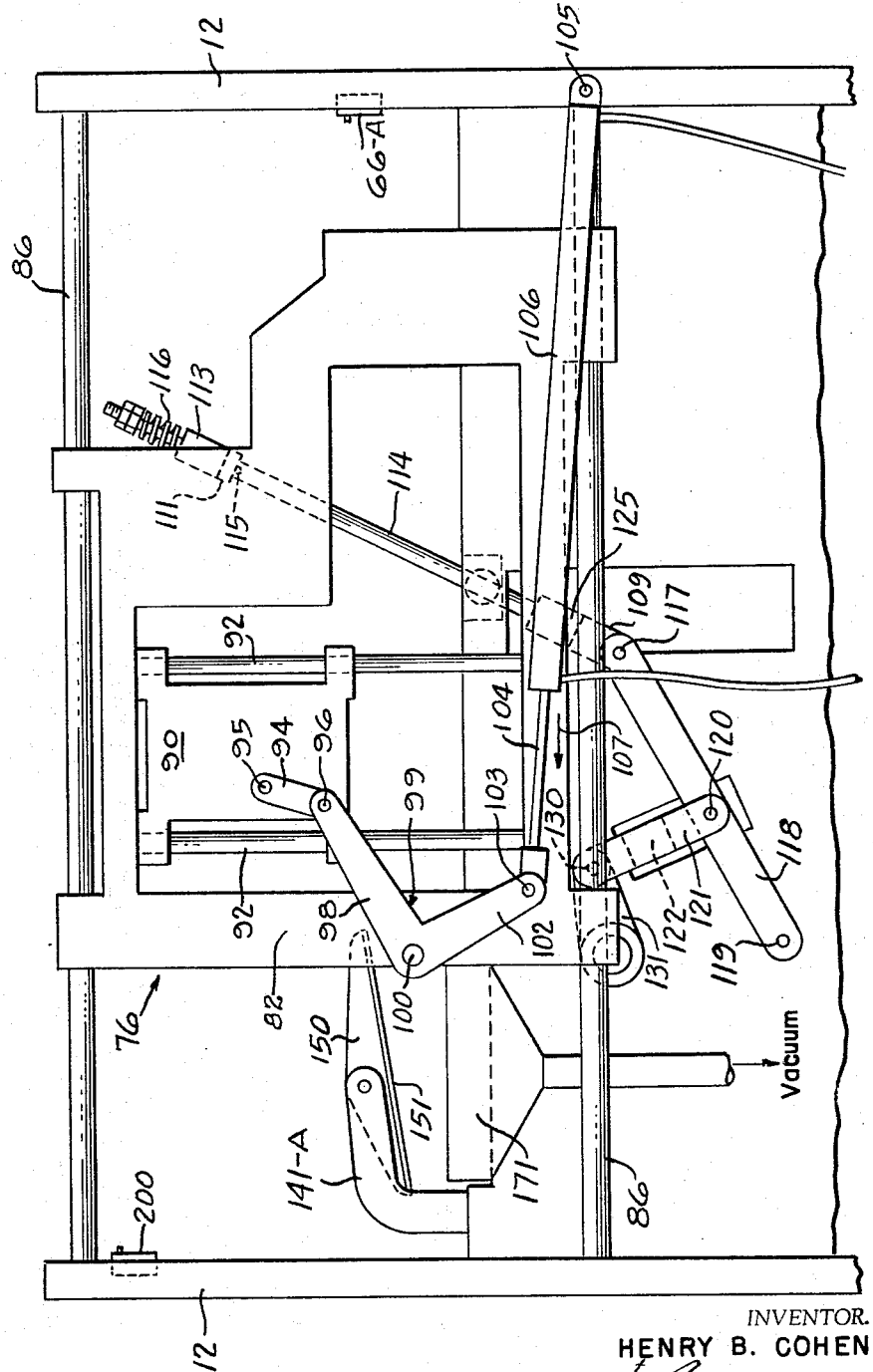
FIG. 3 is a sectional view looking in the direction of line 3—3 on FIG. 1, certain parts being omitted.

Associated with platform 72 is a pusher blade assembly 76 which includes a rear blade 78, an intermediate blade 79 and a front blade 80. Rear blade 78 is attached directly to a bracket 82 which is reciprocable, in the direction of arrow 84, FIG. 1, on rods or upper and lower parallel rails 86 carried by the frame of the machine. Intermediate blade 79 and front blade 80 are connected, by overhead bars 88, to block 90 which is vertically reciprocable on rods 92 carried by bracket 82 whereby blades 79 and 80 are movable up and down on rods 92, as a unit, and whereby bracket 82 and blades 78, 79 and 80 are jointly movable in the direction of arrow 84. Block 90 is reciprocated vertically by a link 94 which is pivoted to block 90 at 95 and is pivoted, at 96, to one arm 98 of a bell-crank 99 which is pivoted at 100 to bracket 82, FIG. 3. The other arm 102 of bell-crank 99 is pivoted at 103 to the piston rod 104 of a double-acting fluid-pressure cylinder 106 which is pivoted at 105 to bracket 82. The manner and sequence of operation of cylinder 106 will be hereinafter explained. It is now sufficient to note that the arrangement of link 94 and bell-crank 99 is such that the initial movement of piston rod 104 in the direction of arrow 107 in FIG. 3 rotates bell-crank 99 in a direction to move block 90 downwardly, and so that continued movement of piston rod 104 moves bracket 82 and blades 78, 79 and 80 forwardly, or to the left as viewed in FIG. 3. Initial reverse movement of piston rod 104 raises block 90 and continued retraction of the piston rod pulls bracket 82, and blades 78, 79 and 80, back to the position shown in FIG. 1, or to the right, as viewed in FIG. 3.

Mounted on the machine framework between rear platform 72 and the intermediate platform 110 is a fixed, electrically heated sealer bar 112 which is preferably coated with Teflon, or similar material, to prevent sticking. Bar 112 extends across the path of forward movement of units 54 and is arranged to coact with a vertically reciprocable bar 113 which is carried by reciprocable rods 114 which are disposed on opposite sides of the path of movement of units 54 from platform 72 toward the front 14 of the machine. On its underside, bar 113 carries a contact element 111 which carries cut-off wire 115 and it is cushioned by springs 116 which absorb excess pressure which may be exerted on bar 113 and fixed heat sealer bar 112 therebelow.

Figures 4, 4A:
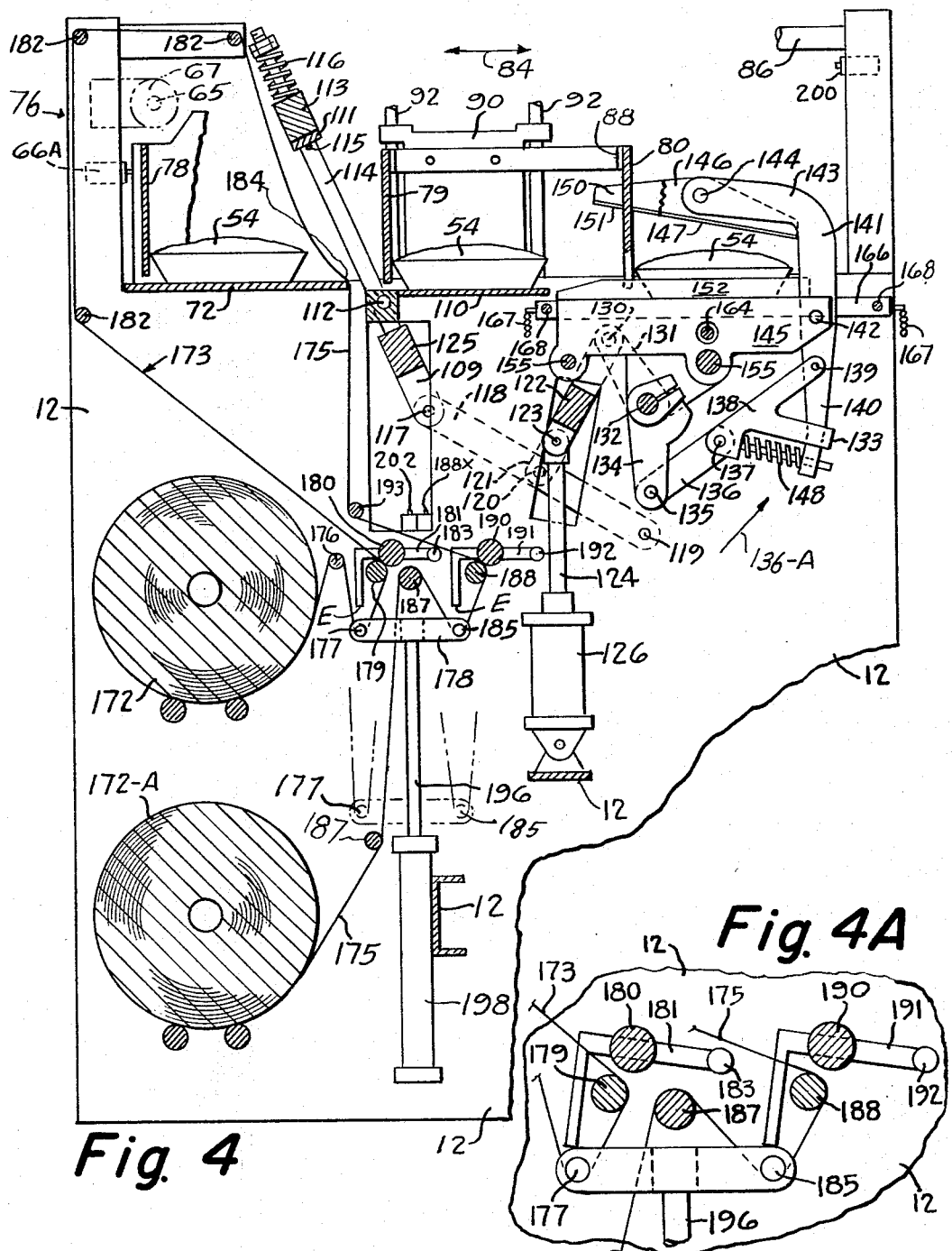
FIG. 4 is a section on line 4—4 on FIG. 1.
FIG. 4A is an enlargement of a portion of FIG. 4, showing another position of the parts.
Figure 5:
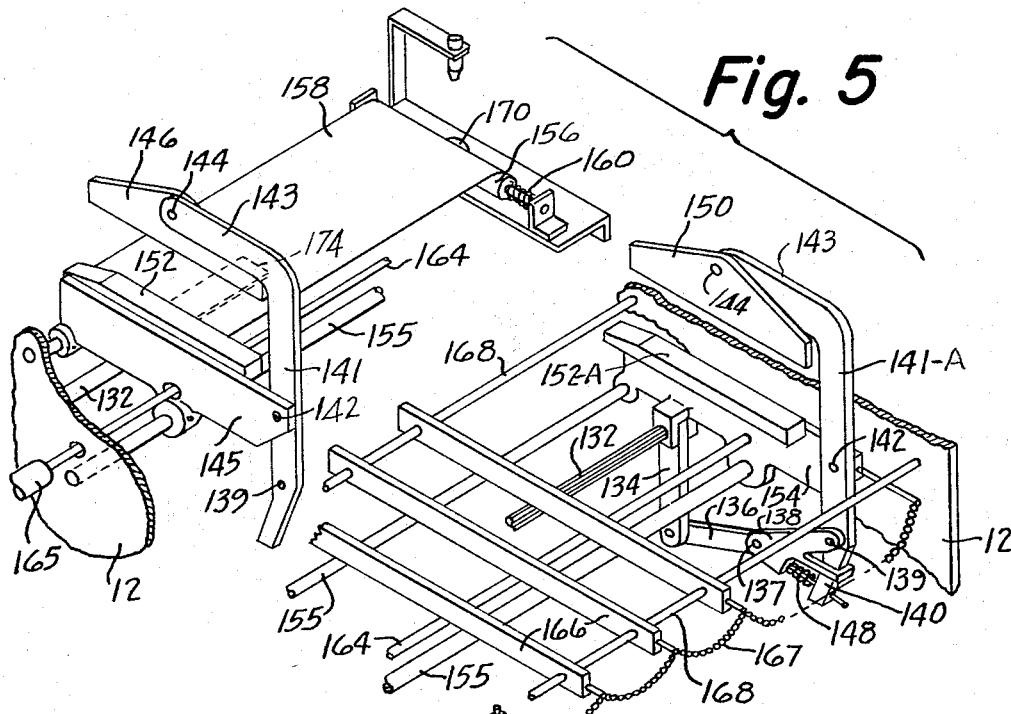
FIG. 5 is a fragmentary perspective view of the front of the machine at the discharge end thereof.
Figure 6:
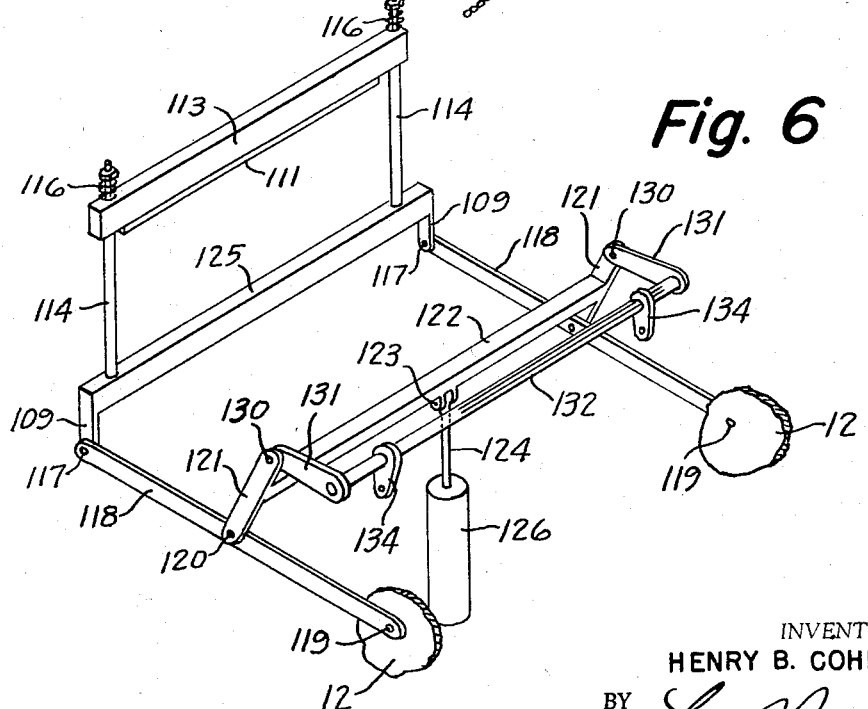
FIG. 6 is a fragmentary perspective view showing details of construction.

As will be seen from FIG. 6, rods 114 are reciprocated to engage pressure bar 113 and cut-off wire 115 with, and to disengage them from, fixed heat sealer 112 by means of cross bar 125 which is secured to the lower ends of rods 114 and the pendent arms 109 of which are pivotally connected, at 117, to the adjacent ends of levers 118, the other ends of which are pivoted at 119 to the frame 12 of the machine. Intermediate their ends, levers 118 are pivoted, as at 120, to links 121 which are rigidly interconnected by a cross-bar 122 which is pivotally connected at 123 to the piston rod 124 of a cylinder 126, hereinafter referred to. The other ends of links 121 are pivotally connected, at 130, to links 131 which are keyed to shaft 132 to which are also keyed links 134 which are pivotally connected, at 135, to the adjacent ends of links 136 whereby downward movement of piston rod 124 moves links 136 in the direction of arrow 136–A in FIG. 4. Links 136 are pivotally connected, at 137, to links 138 which are pivotally connected, at 139, to the lower arms 140 of bell-crank levers 141 and 141–A. Links 138 are provided with forked, or apertured, guide fingers 133 which slidably engage the lower arms 140 of levers 141 and 141–A. Lever 141 is pivoted, at 142, to casting 145, which is fixedly secured to the framework of the machine, FIG. 5, whereas lever 141–A which carries side sealer 150 is pivoted to casting 154 which is movable for the purpose hereinafter fully set forth.

To the upper arms 143 of levers 141 and 141–A are pivoted, as at 144, two elongated side sealers 146 and 150, respectively, whereby rocking levers 141 and 141–A, by the reciprocation of piston rod 124, brings sealers 146 and 150 and the cutting wires 147 and 151 on the underside thereof, into and out of, engagement with the heated sealing bars 152 and 152–A therebelow in the manner, and for the purpose, hereinafter set forth. Between the lower ends of links 138 and the lower ends 140 of levers 141 and 141–A are springs 148 which tension links 138 into alignment with links 136, whereby the movement of links 136 in the direction of arrow 136–A is transmitted to links 138. The strength of spring 148 is such that, under pressure in excess of a predetermined value, springs 148 will be compressed enough to permit links 138 to rotate about pivots 139 to stop the application of further counterclockwise pressure against levers 141 and 141–A, and hence downward pressure against side sealers 146 and 150. Heat sealer bar 152 which coacts with side sealer 146 is carried by fixed casting 145, while sealer bar 152–A which coacts with side sealer 150, is carried by a movable casting 154.

From the foregoing, it will be seen that reciprocation of piston rod 124 raises or lowers cross bar 113 and rocks levers 141 and 141–A in clockwise, or in counter-clockwise direction. By observation of FIG. 6 it will be seen that downward movement of piston rod 124 moves pressure bar 113 into contact with heat sealer bar 112 and simultaneously moves side sealers 146 and 150 into engagement with their heated sealer bars 159 and 152, and vice versa. Since the side sealers 146 and 150 are pivoted, at 144, to levers 141 and 141–A, respectively, they can accommodate themselves to any irregularities of the material to be sealed.

It will be remembered that lever 141 which carries, and operates, side sealer 146 is pivoted, at 142, to fixed casting 145. But, in order to adapt the machine for wrapping packages of varying sizes, casting 154 which carries side sealer 150 and its sealer bar 152–A is mounted for movement towards, and away from, casting 145 and sealer 146. To this end, casting 154 is freely slidable on guide shafts 155 and is connected to piston rod 164 of a fluid pressure cylinder 165 which is operative to move casting 154 toward, and away from, casting 145 and side sealer 146, in the manner and sequence hereinafter set forth. Casting 154 also carries a roller 156 to which is secured one end of a flexible belt 158 of canvas, or the like. The opposite end of belt 158 is connected to the frame of the machine below sealer 146. A torsion spring 160 on roller 156 operates to wind belt 158 on the roller, after the fashion of the well-known, spring-loaded window shade.

Belt 168 rests on bars 166 which are interconnected by front and rear chains 167 to form a flexible, expandable, and contractable, platform. Bars 166 are mounted for movement longitudinally of rods 168 whereby they can be pulled apart or pushed together to adjust the length of belt 158 according to the size of packages 54 to be wrapped and sealed. Platform 154 also carries a photo-electric cell 170 which moves with sealer blade 150 so that when its beam is interrupted by the proximal edge of a unit on belt 158, it stops the movement of side sealer 150 toward side sealer 146 just before sealer blade 150 comes in contact with the package. In the absence of a unit on belt 158, the beam of the photo-electric cell is interrupted by a blocking plate 174 which is located adjacent stationary side sealer 146. Blocking plate 174 is large enough to interrupt the beam of the photo-electric cell to arrest the movement of side sealer 150 before it reaches side sealer 146 but, the width of blocking plate 174 is less than the smallest unit for which the machine is designed.

In the preferred embodiment, two sheets of thermoplastic wrapping material 173 and 175 are used. One of the sheets, such as sheet 173, passes over fixed guide roll 176, under rod 177 which is carried by one end of a bridge member 178 and between fixed sprocket roll 179 and pressure roll 180 which is carried by a bracket 181 which is pivoted to the frame of the machine at 183 whereby roll 180 presses on sheet 173 with a force which is a function of the weight of the roll and the weight of its bracket 181. After passing between sprocket roll 179 and pressure roll 180, sheet 173 passes over triangularly arranged guide rolls 182 and descends to the forward edge 184 of platform 72. Sheet 175 passes over lower and upper fixed guide rolls 187, under rod 185 which is carried by the other end of bridge member 178 and between sprocket roll 188 and pressure roll 190 which is also carried by a bracket 191 pivoted to the frame of the machine at 192 whereby roll 190 presses on sheet 175 with a force which is a function of the weight of the roll and the weight of its bracket 191. After passing between rolls 188 and 190, sheet 175 passes under guide roll 193 and meets sheet 173 at the edge 184 of platform 72. It will be seen that, if the edges of sheets 173 and 175 are held together, and pulled forwardly, or to the right in FIG. 4, sheet 173 will overlie, and sheet 175 will underlie, a unit 54 moving from rear platform 72 to intermediate platform 110.

Sheets 173 and 175 are intermittently drawn from reels 172 and 172–A by the vertical reciprocation of bridge member 178 and rods 177 and 185 thereof which overlie sheets 173 and 175. Bridge member 178 is actuated by the piston rod 196 of cylinder 198. As soon as bridge member 178 begins to move toward the broken line position of FIG. 4, brackets 181 and 191 move, by gravity, to the position of FIG. 4 in which rolls 180 and 190 engage sprocket rolls 179 and 188 to clamp the sheets so that the downward movement of bridge member 178 will draw material from reels 172 and 172–A only. When bridge member 178 is raised to the position of FIG. 4A, it engages the ends E of the brackets and disengages rolls 180 and 190 from rolls 179 and 188 to make it easier for a package 54 moving from platform 72 to platform 110 to pull the material made available by the previous downward movement of bridge member 178.

The mechanical operational sequence is as follows:

A package 54 to be wrapped is placed on front conveyor section 22 and rolls onto rear conveyor section 24, from which it is moved by plate 70 onto platform 72. The upper and lower sheets are first brought together by hand at the front edge 184 of platform 72 and are pulled out past sealer bar 112. The machine is now manually operated (by closing the switches hereinafter described) to bring pressure bar 113 and cutting wire 115 down on heated bar 112. The portion of bar 111 to the left of wire 115 presses the edges of the sheets against heated bar 112 to fuse the same together. Simultaneously, wire 115 cuts off the material in advance, or to the right, of the seal, as viewed in FIG. 4. We now have upper and lower sheets with their sealed edges at, or slightly to the right of, the front edge 184 of platform 72. Therefore, a unit 54, pushed off platform 72 by blade 78 will engage the welded edges of the sheets so that, as the unit moves from platform 72 onto platform 110, it pulls slack portions of the upper and lower sheets (which were pulled down by bridge member 178) with it. When the trailing end of the unit has cleared the front edge 184 of platform 72, bar 113 and wire 115 again descend into contact with heated bar 112. When this takes place, the portion of pressure element 111 to the right of wire 115, as viewed in FIG. 4, will seal the sheets behind a package 54 on platform 110; the portion of pressure element 111 to the left of wire 115 will seal the sheets in advance of a unit on platform 72 and wire 115 will sever the sheets between the two seals.

When a package 54 is pushed, by blade 79, from platform 110 onto belt 158 for sealing the sides of the sheets, side sealer blade 150 is, or is not, moved toward side sealer blade 146, according to the size of the unit, and both of side sealers 146 and 150 are moved into contact with their respective sealer bars 152 and 152–A. In this position, the sheets are sealed at the sides of the unit and wires 147 and 151 sever the excess material. The material cut off by wires 147 and 151 is removed by hand or by suitable suction devices 171.

The manner and order in which the various mechanical operations above described are carried out are diagrammatically illustrated in FIG. 7 in which R is a reservoir of fluid under pressure; in which the various tubes connecting the cylinders with reservoir R are designated by T; the valves which control the supply of fluid under pressure to tubes T are designated by V, and in which the solenoids are designated by reference characters S to S–7, inclusive. Since the cylinders, valves, tubes and solenoids are conventional and since their specific structures are not claimed, they are not shown nor described in detail. It is thought enough to point out that the cylinders may be double-acting in that fluid pressure is admitted, alternately, at opposite ends of the cylinder, or the cylinders may be single-acting in that fluid pressure is admitted at one end to project, or to retract, the piston rod which is moved in the opposite direction by a spring, or other means, and that the solenoids may, when energized or de-energized, operate to close, or to open, a valve, or a switch.

As can be seen from FIG. 7, the cycle of the machine described begins when a package 54 to be wrapped moves gate 48 to the left, as in FIG. 2, to allow switch 56 to close. With switch 64 closed (due to absence of a unit leaning against abutment plate 60) and with switch 74 closed (by shifter plate 70 being in solid line position of FIG. 1, the circuit of solenoid S-1 is completed. When energized, solenoid S-1 opens a valve V to supply cylinder 44 with fluid pressure in a direction to raise piston rod 46 to hump conveyor sections 22 and 24. Since switches 56, 64 and 74 are connected in series, solenoid S-1 cannot open the valve to supply fluid pressure to cylinder 44, unless a unit 54 is leaning against gate 48 to allow switch 46 to close; unless switch 64 is closed (because abutment plate 60 is in the vertical position due to the absence of a package 54 on conveyor section 24), and unless shifter plate 70 is in the solid line position to close switch 74. This prevents the presence of more than one unit on rear conveyor section 24 at one time and prevents any unit from reaching conveyor section 24 before shifter plate 70 has returned to the solid line position of FIG. 1 to guard against a package 54 being caught between the shifter plate and switch 74. When one of switches 56, 64 and 74 is opened, the power is cut off and piston rod 46 of cylinder 44 is automatically retracted.

Rotation of abutment plate 60 in clockwise direction, as viewed in FIG. 2 (by a unit 54 leaning there against), also closes normally open switch 66 and, if switch 66-A is closed by the return of bracket 82 to its solid line position in FIG. 1, the circuit of solenoid S is completed. When energized, solenoid S moves contact arm A of a conventional stepper switch 180X from its inactive position N into engagement with contact 184X to complete the circuit of, and to energize solenoid S-2 to activate cylinder 165 in a direction to move side sealer 150 towards side sealer 146. Since photo-electric cell 170 moves with side sealer 150, it will be activated by the presence of a unit on belt 158 or by blocking plate 174. Activation of photo-electric cell 170 energizes solenoid S which now moves arm A into engagement with contact 186 to energize solenoid S-3 in a direction to open the valve which supplies cylinder 126 to pull pressure bar 113 and wire 115 down into sealing and cutting contact with heated bar 112. It will be remembered that cylinder 126 also simultaneously actuates links 121, bar 122, links 131, 134, 136 and 138, which are represented by broken line 126-A in FIG. 7, to move side sealers 146 and 150 and their cutting wires 147 and 151 into sealing and cutting position relative to their heated bars 152 and 152-A. Engagement of switch arm A with fixed contact 186 also energizes solenoid S-4 to activate cylinder 67 to move shifter plate 70 away from its solid, to its broken, line position in FIG. 1. It will be remembered that this movement of plate 70 which delivers a package to be wrapped to platform 72 also opens switch 74 and breaks the circuit of solenoid S-1 which activates cylinder 44 to retract, or to permit retraction of, piston rod 46 to straighten out conveyors 22 and 24. Downward movement of pressure bar 113 activates a time delay device T/D which is in series with switch 188X whereby, when the time delay device completes its cycle, it closes switch 188X. This delay insures enough sealing and cutting time between pressure bar 113 and side sealers 146 and 150 with their respective heated bars 112, 152 and 152-A.

Closing switch 188X energizes solenoid S and moves switch arm A into engagement with contact 190X. In this position, solenoid S-5 is energized to supply cylinder 165 with fluid pressure in a direction to reverse the movement of piston 164 and move side sealer 150 away from side sealer 146, or back to the position shown in FIG. 1.

Return of side sealer 150 to the position of FIG. 1 closes switch 192X which is in series with switch 194 so that if switch 194 is closed by the return of shifter plate 70 to the solid line position of FIG. 1, solenoid S will be energized to move switch arm A into engagement with contact 197. This energizes solenoid S-6 which moves bracket 82 and pusher blades 78, 79 and 80 forwardly to move units 54 forwardly. When bracket 82 reaches the end of its forward movement, it closes switch 200 which energizes solenoid S to move contact arm A back to neutral, or ready position N. The resultant de-energization of solenoid S-6 causes, or permits, cylinder 106 to return bracket 82 and pusher blades 78, 79 and 80 back to the position of FIG. 1 in which switch 66-A is again closed.

Downward movement of rods 114 also closes switch 202 which energizes solenoid S-7 to actuate piston rod 196 in a direction to pull bridge member 178 downward, thus pulling additional lengths of sheet material from reels 172 and 172-A for use by the unit 54 which is next pushed from platform 72 to platform 110.

It will be seen from the foregoing that, with switch 56 open, by a unit leaning against gate 48; with switch 64 closed; and with switches 74 and 194 closed, a unit 54 placed on conveyor 22 will roll down against gate 48 to start a new cycle.

From the foregoing, it will also be seen that with one unit on conveyor 24; one unit on platform 72, and one unit on platform 110, the machine is in a position to operate continuously, as long as additional units 54 are fed to front conveyor 22, one at a time, and suitably spaced from the standpoint of time. This is due to the fact that each unit triggers the machine ahead so that while the first unit is on platform 110, the second unit will be on platform 72; the third unit will be on conveyor 24 and the fourth unit will be on conveyor 22. This leaves belt 158 open to receive the first unit where the sides of the sheets are joined. As this is being done, a new unit arrives at conveyor 22 and the other units are advanced one step each.

Sealer bars 112, 152 and 152-A are heated subject to the control of a conventional thermostat but in the preferred embodiment, bars 112, 152 and 152-A are heated intermittently so as to bring the contiguous sheets to the fusing point and to allow the fused area to cool enough to permit wires 115, 147 and 151 to cut the sheets without distortion of the seam and without the fused material adhering to the cutting wires. This pulsating energy is supplied by means of a purchased device, the details of which form no part of the invention. For information as to the structure and operation of the device, reference may be had to Patent No. 2,796,913.

In the appended claims, "transverse" is used to designate a direction normal to the direction of movement of a package from conveyor 22 to conveyor 24, or from platform 72 to platform 110; "lateral" is used to indicate a direction parallel to the front to rear, and rear to front movement of the packages; "station" is used to designate platforms 72 and 110 and belt 158; "cylinder" is used to designate pneumatic or hydraulic, or mechanical means which can be actuated by a solenoid, by a motor, or other switch-controlled device; "unit" is used to designate the object to be wrapped and sealed; and "envelope" is used to designate the upper and lower sheets 173 and 175. Either, or both, of sheets 173 and 175 may be air pervious or air tight, or transparent, or opaque, shrinkable or shrink-proof, etc., the only requirement being that the sheets be capable of being joined to produce the desired seal.

Stepper switch 180X, which includes contacts 184X, 186, 190 and 197, is also a purchased item and hence is not shown nor described. For knowledge of a switch which can serve the purpose, reference may be had to Patent No. 2,323,840.

What I claim is:

1. A machine for wrapping and sealing a succession of objects in heat fusible sheet material, said machine including
a first sealing station,
a first heat-sealing element at said first station and disposed transversely of the path of movement of an object toward said first station,
a second sealing station,
a pair of spaced heat-sealing elements disposed parallel to the path of movement of an object approaching said second sealing station,
means for operating all of said sealing elements to fuse the sheet material along the transverse and longitudinal margins of each object, and means controlled by the width of the object for varying the distance between said spaced sealers at said second station accordingly.

2. machine for wrapping and sealing an object in heat fusible material, said machine including
a sealing station,
a first platform immediately in advance thereof,
means for moving an object to be wrapped and sealed onto said platform,
means for feeding a lower sheet of said fusible material from below said platform to said sealing station,
means for feeding an upper sheet of fusible material from above said platform to said station,
heat-sealing means disposed transversely of the path of the object toward said station for fusing said sheets together at said junction to provide the closed, leading end of an envelope,
a second platform to the other side of said station,
means actuating said heat-sealing means upon the arrival of an object on said first platform,
means for propelling said object from said first platform past said sealing station and onto said second platform whereby said object engages said closed leading end and draws said lower and upper sheets over the upper and lower sides thereof and the trailing end of said envelope will be at said station,
means for actuating said sealing means upon arrival of the object on said second platform to fuse said sheets to provide the closed trailing end of said envelope,
a third platform disposed in the path of movement of the object beyond said second platform,
a pair of spaced sealing elements disposed parallel to the path of movement of an object approaching said third platform,
means mounting said spaced sealers for movement toward, and away from, each other,
means for moving said sealing elements into heat-sealing engagement with the sides of an object on said third platform,
means for automatically moving an object from the first to the second platform, from the second to the third platform, and means for pushing an object wholly off said third platform.

3. A machine for wrapping an object in heat fusible material, said machine including
a first station,
a second station,
a first source of sheet material,
a first actuating means for propelling said object from said first to said second station,
means feeding sheet material from said first source so as to underlie the path of movement of the object,
a second source of sheet material,
means for feeding sheet material from said second source so as to overlie the object,
a first heat-sealing mechanism located between said stations, said first mechanism including
a fixed, lower heated bar below the path of movement of said first sheet and transversely of the path of movement of the object, and an upper, vertically reciprocable pressure bar, and means for moving said pressure bar into engagement with said heated bar to fuse the portions of said sheets therebetween immediately in advance of an object on said first station and immediately behind an object on said second station,
an expandable and contractable platform beyond said second station,
a second actuating means for moving the object onto said platform,
a second heat-sealing mechanism located adjacent said platform and comprising a fixed lower heated bar located below the path of movement of said first sheet and adapted to underlie one longitudinal side of the object at said platform, and an upper movable pressure bar adapted to overlie said one side of the object,
a third heat-sealing mechanism comprising a fixed lower heated bar located below the path of movement of said first sheet and adapted to underlie the other side of the object, and an upper pressure bar overlying said other side,
a third actuating means for bringing the pressure bars of said second and third heat-sealing mechanisms into engagement with their respective heated bars to fuse said sheets along the opposite sides of the object,
and adjusting means controlled by the width of an object approaching said platform to contract and expand said platform transversely of the path of movement of said object according to the width of said object.

4. The structure recited in claim 3 and
means constantly biasing said platform in contracting direction,
means mounting said third heat-sealing mechanism for movement toward, and away from, said second heat-sealing mechanism,
means operatively connecting said third sealing mechanism to the adjacent end of the platform,
and actuating means for moving said third sealing mechanism toward, and away from, said second sealing mechanism to expand and contract the platform according to the size of the object on the platform.

5. The structure recited in claim 4 and control means movable with said third sealing mechanism and responsive to the size of the object on said platform for limiting the movement of said third sealing mechanism toward said second sealing mechanism according to the size of the object.

6. The structure recited in claim 3 and a receiving station in advance of said first station,
and a conveyor inclined downwardly towards said receiving station for delivering an object to said first station by gravity
and means responsive to the passage of an object over said conveyor for reversing the inclination of said conveyor to prevent the presence of more than one object at said receiving station at one time.

7. The structure recited in claim 6 and means responsive to the presence of an object at said receiving station to re-set the conveyor to its original inclination.

8. A wrapping and sealing machine for packages comprising
a supporting framework,
a conveyor on said framework
and a wrapping and sealing assembly supported by said framework in parallel relation to said conveyor,
said conveyor being constructed and arranged to feed package units in series from a front end of said machine to the opposite rear end thereof,
shift means operatively connected to said conveyor for intermittently transversely shifting the rearmost package unit from said conveyor to said wrapping and sealing assembly,
means operatively connected to said conveyor for intermittently interrupting the feed of said package units on said conveyor when the rearmost package unit is being transversely shifted, pusher means on said wrapping and sealing assembly to move package units in a path parallel, but opposite their path of movement on the conveyor, said pusher means being constructed and arranged to move a plurality of package units in series from one treating station to the next, means for feeding thermoplastic sheet material into the path of movement of said package units on the wrapping and sealing assembly whereby each package unit is enveloped by a wrapper of thermoplastic sheet material as it is moved by the pusher means, cut-off means to sever the enveloping wrapper around each package unit from that next adjacent thereto, heat-sealing means to seal the edges of the enveloping wrappers around their respective package units, said cut-off and heat-sealing means being operatively connected to said conveyor, and pusher means for operation in timed relation therewith, said heat-sealing means including a pair of side sealer members, at least one of which is movable toward and away from the other, sensing means connected to the movable side sealer members, said sensing means being constructed and arranged to limit movement of said movable side sealer member toward the other side sealer member in accordance with the width of a package unit positioned therebetween by said pusher member, and means to move said movable side sealer member and said pusher member back to their initial positions after said side sealer members have sealed the corresponding edges of the wrapper around the package unit therebetween.

9. The machine of claim 8 wherein a collapsible supporting means for a package unit is positioned between the side sealer members and is constructed and arranged to vary its size in accordance with the distance between said side sealer members.

10. The machine of claim 8 wherein said conveyor is horizontal, but downwardly inclined from said front to said rear end of the machine, said conveyor comprising a front section and a rear section pivotally connected to each other and to said machine framework, and said means for intermittently interrupting the feed of said package units by said conveyor comprising a vertically movable humping means connected to said rear section of the conveyor and constructed and arranged to move said rear section up and down around its pivot connection with the machine framework, said humping means being operatively connected to a pivotal gate member, said gate member being pivotally connected to the machine framework and having a portion projecting into the path of movement of said package units on the conveyor, and a sensing means on said gate member in operative connection with said humping means to activate said humping means for vertical movement.

11. The machine of claim 8 wherein a pivoted abutment plate is positioned at the rearmost end of said conveyor, said abutment plate having sending means thereon for activating said shift means when a package unit is in contact with said abutment plates, said shift means being movable only when the feed of said package units on said conveyor is interrupted.

12. The machine of claim 8 wherein means are provided to prevent actuation of said cut-off and heat-sealing means until said pusher means is in a predetermined position.

13. The machine of claim 8 wherein there are three stations on said wrapping and sealing assembly comprising a rear station, an intermediate station and a front station, said pusher means comprising three spaced, parallel sweeper blades on a horizontally movable bracket, the rearmost blade being rigid with said bracket and the intermediate and front blades being movable in vertical directions relative to said bracket as they move horizontally with said bracket, said intermediate and front blades being raised when said bracket moves rearwardly and being lowered when said bracket moves forwardly.

14. The machine of claim 8 wherein said means for feeding the thermoplastic sheet material comprises a pair of separate reels, each reel having a strip of thermoplastic sheet material wound thereon, the strip from one reel being joined to the strip from the other reel in end-to-end connection by said cut-off and heat-sealing means simultaneously with the enveloping of each package unit by the wrapper formed from said thermoplastic sheet material, and means operatively connected to said cut-off and heat-sealing means for drawing strip material from said reels in timed relation with the movement of said cut-off and heat-sealing means.

15. In a package wrapping and sealing machine, a framework, a front and rear end on said framework, a conveyor extending from said front to rear end, said conveyor being inclined from front to rear and comprising a front section and a rear section, said sections both being pivotally connected to said framework at one end and to each other at the other end, a series of spaced, parallel shafts on said first section, each shaft supporting a plurality of rollers, said second section having a front portion comprising shafts and rollers similar to said first section and having a rear portion comprising a series of spaced, parallel rotatable rods, a gate member pivoted to the framework and extending through said front portion of the rear section of the conveyor, said gate member being pivotally movable by a package unit on said conveyor and having sensing means operatively connected to a humping means for controlling said humping means, said humping means being vertically movable and being operatively connected to said rear section of the conveyor to pivot said rear section on its pivotal connection with the framework, a shift means movable transversely of said conveyor above the rotatable rods at the rear portion of said rear section, said shift means being operatively connected to said humping means for timed actuation in relation thereto, said shift means being transversely reciprocable to shift a package unit into the path of wrapping and sealing assembly, and means on said wrapping and sealing assembly to envelop a package unit with a thermoplastic wrapper and seal said wrapper in timed relation with the actions of said conveyor and shift means.

16. In a package wrapping and sealing machine, a conveyor operatively connected to a wrapping and sealing assembly, said wrapping and sealing assembly comprising a rear station,
an intermediate station and a front station,
a pusher means comprising
a sweeper blade assembly being horizontally movable to move package units intermittently from the rear to the intermediate and then to the front station and to then move the package units off the machine,
said sweeper blade assembly comprising
a horizontally movable bracket having a rear blade rigid therewith
and an intermediate and front blade vertically movable thereto,
said blades being arranged in spaced, parallel relation to each other,
said intermediate and front blades being simultaneously raised just prior to movement of the bracket rearwardly and simultaneously lowered just prior to movement of the bracket forwardly,
means to feed thermoplastic sheet material to said rear station in the path of movement of the package units by the sweeper blade assembly,
cut-off and heat-sealing means to partially envelop a package unit with a wrapper formed from said thermoplastic sheet material at said rear station, and
side sealer means for sealing the sides of the wrapper on another package unit at the front station,
said cut-off and heat-sealing means and said side sealer means being operatively connected for simultaneous actuation.

17. In a package wrapping and sealing machine, a feed means for wrapper sheet material comprising
a first reel adapted to carry a first roll of sheet material,
a second reel adapted to carry a second roll of sheet material,
a movable piston having a bridge member thereon,
a first guide roll on one end of said bridge for receiving and guiding the sheet material from said first reel,
a second guide roll on the other end of said bridge for receiving and guiding the sheet material from said second reel,
a sprocket wheel adjacent each of said guide rolls, but free from said bridge members,
and a pressure roll operatively positioned adjacent each of said sprocket wheels,
one of said sprocket wheels and the adjacent pressure roll coacting to receive therebetween the sheet material from one of said reels, and the other sprocket and pressure wheel coacting to receive therebetween sheet material from the other of said reels,
said bridge member being movable with said piston to unwind said strips from their reels,
said sprocket wheels and pressure rolls being constructed and arranged to lock the strips therebetween during the unwinding of said strips.

References Cited by the Examiner

UNITED STATES PATENTS

| | | | |
|---|---|---|---|
| 2,931,148 | 4/1960 | Smith | 53—182 X |
| 3,158,973 | 12/1964 | Monaghan | 53—66 |
| 3,188,782 | 6/1965 | Lapides | 53—198 X |
| 3,191,356 | 6/1965 | Zelnick et al. | 53—373 X |

TRAVIS S. McGEHEE, *Primary Examiner.*